(12) United States Patent
Luthra et al.

(10) Patent No.: US 9,819,994 B2
(45) Date of Patent: *Nov. 14, 2017

(54) MOVING CONTENT BETWEEN SET TOP BOX AND END DEVICES IN HOME

(71) Applicant: Google Technology Holdings LLC, Mountain View, CA (US)

(72) Inventors: Ajay K. Luthra, San Diego, CA (US); Michael A. Grossman, San Diego, CA (US); Praveen N. Moorthy, San Diego, CA (US); Paul Moroney, La Jolla, CA (US); Arjun Ramamurthy, San Diego, CA (US); Haifeng Xu, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,678

(22) Filed: Feb. 6, 2017

(65) Prior Publication Data

US 2017/0155951 A1    Jun. 1, 2017

Related U.S. Application Data

(63) Continuation of application No. 14/816,918, filed on Aug. 3, 2015, now Pat. No. 9,565,468, which is a
(Continued)

(51) Int. Cl.
*H04N 21/436* (2011.01)
*H04N 21/41* (2011.01)
(Continued)

(52) U.S. Cl.
CPC ... *H04N 21/43615* (2013.01); *H04N 21/4126* (2013.01); *H04N 21/4147* (2013.01); *H04N 21/4363* (2013.01); *H04N 21/4516* (2013.01)

(58) Field of Classification Search
CPC ......... H04N 21/4126; H04N 21/43615; H04N 21/4147; H04N 21/4402; H04N 21/4516; H04N 21/4363
See application file for complete search history.

(56) References Cited

U.S. PATENT DOCUMENTS 9,100,689 B2 * 8/2015 Luthra ............... H04N 21/4126
9,565,468 B2 * 2/2017 Luthra ............... H04N 21/4126
(Continued)

OTHER PUBLICATIONS

Notice of Allowance dated Mar. 27, 2015 in U.S. Appl. No. 13/071,233.
(Continued)

*Primary Examiner* — Huy T Nguyen
(74) *Attorney, Agent, or Firm* — Byrne Poh LLP

(57) ABSTRACT

A content moving device which enables providing content stored on a first user device, such as a DVR, in a first format and resolution to be provided to a second user device, such as a portable media player (PMP) in a second format and resolution. The content moving device identifies content on the first user device as candidate content which may be desired by the PMP and receives the candidate content from the DVR. The content moving device transcodes the candidate content at times independent of a request from the PMP for the content. The content moving device may provide a list of available transcoded content to the PMP for selection, and provide selected content to the PMP. The content moving device may also provide information relating to any protection schemes of the content provided to the PMP, such as DRM rights and decryption keys. The content moving device performs the often computationally intense and time consuming transcoding of user content to enable the user to move content between different user devices in a convenient manner.

21 Claims, 7 Drawing Sheets

Related U.S. Application Data continuation of application No. 13/071,233, filed on Mar. 24, 2011, now Pat. No. 9,100,689.

(60) Provisional application No. 61/317,262, filed on Mar. 24, 2010, provisional application No. 61/317,264, filed on Mar. 24, 2010.

(51) Int. Cl.
*H04N 21/4363* (2011.01)
*H04N 21/45* (2011.01)
*H04N 21/4147* (2011.01)

(56) References Cited

U.S. PATENT DOCUMENTS

| | | |
|---|---|---|
| 2004/0190853 A1 | 9/2004 | Dow et al. |
| 2006/0007479 A1 | 1/2006 | Henry et al. |
| 2007/0087751 A1 | 4/2007 | Voyer et al. |
| 2009/0012985 A1 | 1/2009 | Matsubara et al. |
| 2010/0121941 A1 | 5/2010 | Harrang et al. |
| 2011/0083157 A1 | 4/2011 | Addair |
| 2011/0212723 A1 | 9/2011 | Kunz et al. |
| 2011/0304767 A1 | 12/2011 | Sahdra et al. |

OTHER PUBLICATIONS

Notice of Allowance dated Sep. 26, 2016 in U.S. Appl. No. 14/816,918.
Office Action dated Jul. 3, 2013 in U.S. Appl. No. 13/071,233.
Office Action dated Sep. 11, 2014 in U.S. Appl. No. 13/071,233.
Office Action dated May 5, 2016 in U.S. Appl. No. 14/816,918.
Office Action dated Oct. 26, 2012 in U.S. Appl. No. 13/071,233.

* cited by examiner

MOVING CONTENT BETWEEN SET TOP BOX AND END DEVICES IN HOME

CROSS-REFERENCE TO RELATED APPLICATIONS

This application is a continuation U.S. patent application Ser. No. 14/816,918, filed on Aug. 3, 2015, which is a continuation of U.S. patent application Ser. No. 13/071,233, filed on Mar. 24, 2011, which claims the benefit of U.S. Provisional Patent Application No. 61/317,262, filed on Mar. 24, 2010, and U.S. Provisional Patent Application No. 61/317,264, filed on Mar. 24, 2010, each of which are incorporated by reference herein in its entirety.

TECHNICAL FIELD

The invention relates to a content management device, and more particularly toward a management of a transcoding and storage device.

BACKGROUND

Consumers receive content in various forms using several different devices. For example, consumers may receive video content, e.g., television programs and movie, or audio content, e.g., music, through a set top box (STB) connected to a service provider network. The content may be stored on a digital video recoding (DVR) device at the request of the user, and retained on the DVR for an indefinite period of time, e.g., until deleted by the user. The STB is typically connected to a television device which displays the video content or plays the audio content to the consumer. The typical television device is a non-portable stationary unit inside a household.

Many consumers wish to view his/her content stored on their home DVR on the go, on his/her mobile device, whenever he wishes. Unfortunately, most mobile devices cannot process content that is high definition (HD, e.g., 720p, 1080i, 1080p) or even standard definition (SD, e.g., 480i) resolution, which is the common resolution for the DVR. Further, DVR content is often received and stored as MPEG2 (Motion Picture Experts Group) transport streams, while most mobile devices are configured to pay MPEG4 (AVC/H.264) file oriented content. Most DVR audio is coded as Audio Codec 3 (AC-3) format, while most mobile devices play the Advanced Audio Coding (AAC) format. Somehow, the consumer's intention must be met, despite these mismatches.

The content may be converted (transcoding) the content from the format and coding on the DVR to the desired format of the consumer's mobile device. However, transcoding of this sort takes time, in fact, often almost as much time as it would take to play the content. Most consumers do not have the patience to wait, for example, nearly 90 minutes to get programs transferred to his/her mobile devices. It would be desirable for the consumer to be able to see the content choices available for transfer to their portable media player (PMP), including a mobile phone or smart phone, make a quick decision for transfer, quickly receive and be able to access the content without significant waiting periods.

SUMMARY

In accordance with the principles of the invention, an apparatus for moving content from a first user device to a second user device, may comprise: a first device interface configured to receive content in a first format from the first user device; a device manager configured to identify characteristics of the first format of the candidate content, and to request the candidate content from the first device; a transcoder configured to transcode the candidate content by decoding the candidate content in the first format as decoded content and encoding the decoded content into a second format compatible with the second user device as transcoded content; a storage unit which stores the transcoded content; and a second device interface configured to provide transcoded content to the second device, wherein the candidate content is transcoded independent of a request for the candidate content by the second user device.

In the apparatus the device manager reviews content at the first user device at predetermined intervals. The device manager may determine if the first user device has new content, and request the new content during recording of the new content at the first user device. The device manager receives a notification of an event at the first device, and the candidate content is received based on the event. The device manager may determine a format and resolution of the first format or the second format. The device manager may determine a format and resolution of the second format. The device manager may determine if the candidate content is protected, determine a protection scheme of the candidate content, and provide information related to the protection scheme to the second user device, enabling the second user device to access the content. The device manager may provide a list of available transcoded content to the second user device, and receives requests to provide content to the second user device based on selection from the list of available transcoded content.

In accordance with the principles of the invention a method for moving content from a first user device to a second user device using a content moving device, may comprise the steps of: the content moving device identifying content on the first user device in a first format as candidate content to be moved to the second user device; receiving the candidate content from the first device; transcoding the candidate content by decoding the candidate content in the first format as decoded content and encoding the decoded content into a second format compatible with the second user device as transcoded content; storing the transcoded content in a storage associated with the content moving device; providing the transcoded content to the second user device when requested by the second user device, wherein the candidate content is received from the first user device and transcoded independent of a request for the candidate content by the second user device.

In the method, the step of identifying the content on the first user device includes reviewing content contained on the first user device at predetermined intervals. The step of identifying the content on the first user device determines if the first user device has new content, and request the new content during recording of the new content at the first user device. The step of identifying the content on the first user device may include receiving a notification of an event at the first user device, and receiving the content based on the event. The content moving device may determine a format and resolution of the first format. The content moving device may determine a format and resolution of the second format. The content moving device may determine if the candidate content is protected. The content moving device may determine a protection scheme of the candidate content, and provide information related to the protection scheme to the second user device, enabling the second user device to access the content. The content moving device may provide a list of available transcoded content to the second user device, and receive requests to provide content to the second user device based on selection from the list of available transcoded content.

In accordance with the principles of the invention, a non-transitory computer readable medium may contain a computer implementable instructions for moving content from a first user device to a second user device using a content moving device, comprising the steps of: the content moving device identifying content on the first user device in a first format as candidate content to be moved to the second user device; receiving the candidate content from the first device; transcoding the candidate content by decoding the candidate content in the first format as decoded content and encoding the decoded content into a second format compatible with the second user device as transcoded content; storing the transcoded content in a storage associated with the content moving device; providing the transcoded content to the second user device when requested by the second user device, wherein the candidate content is received from the first user device and transcoded independent of a request for the candidate content by the second user device.

In the instructions on the computer readable medium, the step of identifying the content on the first user device includes reviewing content contained on the first user device at predetermined intervals. The step of identifying the content on the first user device determines if the first user device has new content, and request the new content during recording of the new content at the first user device. The step of identifying the content on the first user device includes receiving a notification of an event at the first user device, and receiving the content based on the event. The content moving device may determine a format and resolution of the first format. The content moving device may determine a format and resolution of the second format. The content moving device may determine if the candidate content is protected. The content moving device may determine a protection scheme of the candidate content, and provide information related to the protection scheme to the second user device, enabling the second user device to access the content. The content moving device may provide a list of available transcoded content to the second user device, and receive requests to provide content to the second user device based on selection from the list of available transcoded content.

The content mover device enables a user to conveniently and efficiently move user recorded content from one user device (e.g., a DVR) to another user device (e.g., PMP). The content mover device performs the often time consuming and computationally intensive task of transcoding content stored on the first device in a first format into a second format usable by the second device. The transcoding operation may be performed automatically independent of a request for the content by the PMP. The transcoding operation may be performed at predetermined times during periods of inactivity or based on historical user interactions with the content mover device or DVR. In this manner user may not need to wait for desired content to be transcoded in order to move the content onto his/her PMP.

DETAILED DESCRIPTION

For simplicity and illustrative purposes, the present invention is described by referring mainly to exemplary embodiments thereof In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Figure 1:
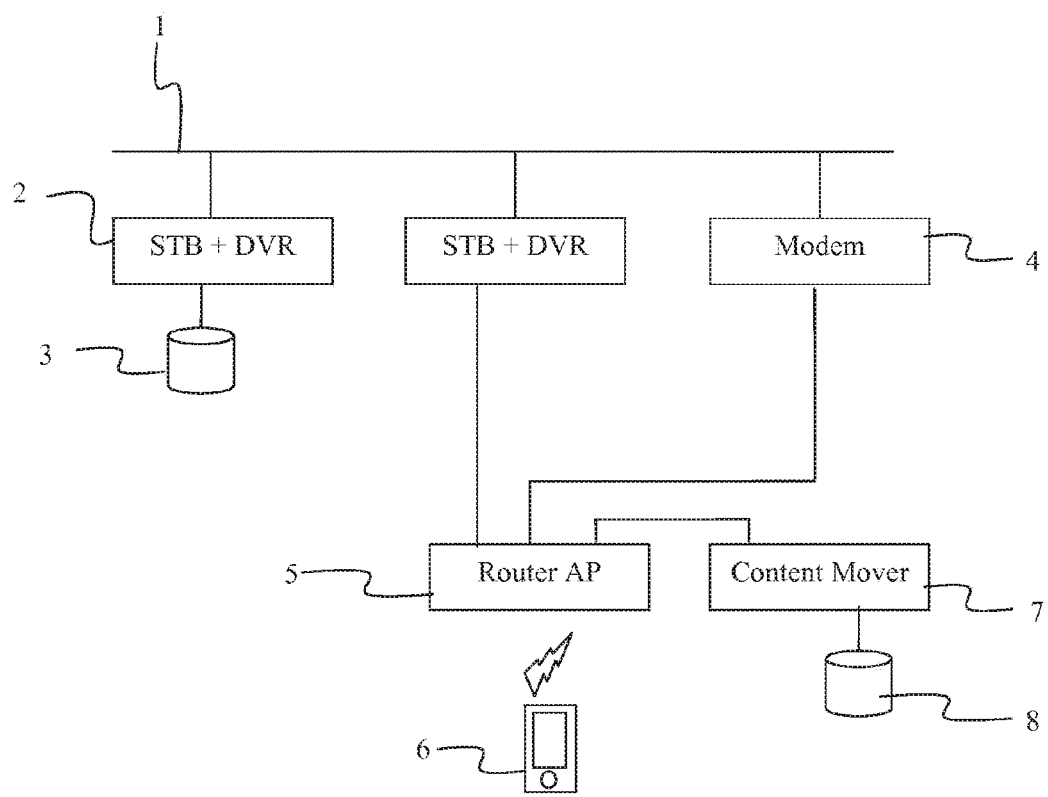
FIG. 1 illustrates an exemplary home network arrangement using a content moving device in accordance with the principles of the invention.

FIG. 1 illustrates an exemplary home network arrangement using a content moving device in accordance with the principles of the invention. The content moving device described herein may be an accessory that is placed between the consumer's DVR and his mobile devices, as illustrated in FIG. 1. It transcodes, that is, converts, the format mismatches for video and audio and the transport packaging. In a preferred implementation, the mover performs this function with minimal disruption to the consumer.

The content moving device may be connected to the DVR on a permanent basis, by Ethernet or some similar home network technology, such as a Media over Coax Alliance (MoCA) standard, e.g., MoCA MAC/PHY v1.0. Thus the content moving device can do what the mobile device cannot—always be present and connected. Thus the Content moving device can transcode at its somewhat slow pace in the background, building a store of program files compatible to the mobile devices. The Content moving device storage may be viewed as a mirror of the DVR content, (e.g., being an exact duplicate of content stored if possible). If this is achieved, the consumer can check for available recordings, and then transfer them to the mobile device, with the transfer limited only by his home network. In this fashion, the consumer's intent can be supported. Ideally, the Content moving device is an "invisible" device, with no direct user interaction required, and possibly not even any out-of-box set up at all. An Ethernet connected Content moving device typically requires no mandatory set up, while a WiFi connected Content moving device may require a Service Set Identifier (SSID) and key. The moving device may provide for full automation of the content transcoding and transfer.

The consumer already has learned how to interact with his DVR to schedule recordings and view content, and he has also learned to use his portable device. Learning another mandatory User Interface on the content mover device may not be highly desirable for some users. For that user it is optimal to have him interact solely through the end device and perhaps the DVR, to accomplish his on-the-road needs for content.

The content moving device may check for new content recordings and new DVR deletions on a regular basis. Any change in the DVR may be mirrored in the Content moving device's own memory. The Content moving device may handle all the details of copy management, and obey the digital rights associated with the DVR recording, such as obeying copy once restrictions of the original broadcast program, obeying copy once restrictions for example.

FIG. 1 illustrates an exemplary home network arrangement using a content moving device in accordance with the principles of the invention. As shown in FIG. 1, a user household 1 may include one or more STBs 2 with a DVR integrated therein or separately attached. An external storage device 3 may also be used with STB 2 to store additional content. While multiple STBs 2 are illustrated, only one may be present or only one may have a DVR while other STB may not include a DVR. The STB receives communications over a communication carrier 1, such as a coaxial cable, optical fiber or wireless communication carrier.

The communications may include video, audio/video (e.g., television programs or movies), audio information, data, and STB control and signaling information. The communications may be a provider network, which may charge for providing communication and content services to the user. The communications may be bi-directional, e.g., downstream from the service provider and upstream from the STB. Typical provider networks include over the air free broadcasts, cable television networks (including optical fiber networks, hybrid fiber coax (HFC) networks, etc.), or satellite television networks. STB 2 preferably received content through the network and provides the content to television (not shown) for display to a user. STB 3 may also record content selected by a user on its associated DVR.

In an exemplary arrangement as illustrated in FIG. 1, a modem 4 may also receive communications through communication carrier 1. Alternatively, modem 4 may receive communications from a different network than STBs 2. Modem 4 may be connected to a in home router 5, such as via Ethernet port connections, wireless connection or other suitable connection. Router 5 may be connected to a content mover device 7 via an Ethernet connection, a wireless (WiFi), USB data, or other suitable type of connection.

The router 5 may communicate with STB 2 via an Ethernet, Universal Serial Bus USB, wireless (WiFi) or other suitable type of connection. The router 5 maybe directly connected to STB 2 or via another device, such as a MoCA bridge (not shown) which may connect to the STB via communication carrier 1. Router 5 may communicate directly with STB 2 via an Ethernet connection, connecting a plurality of STBs to each other, which may also serve as the communication carrier 1. Router 5 may provide a hardwired or wireless connection (e.g., a WiFi connection) to a portable device 6, such as a mobile phone, portable media player, laptop, PC, tablet, etc.

Figure 2:
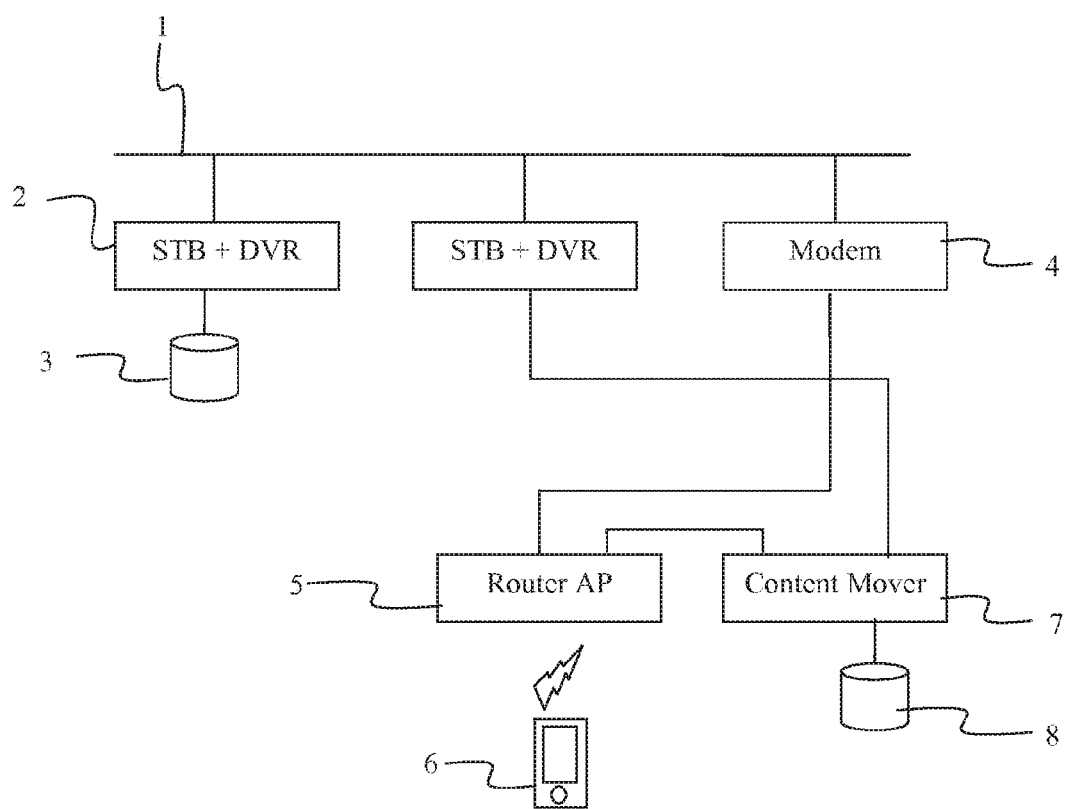
FIG. 2 illustrates an alternate arrangement for a home network using a content mover device in accordance with the principles of the invention.

FIG. 2 illustrates an alternate arrangement for a home network using a content mover device in accordance with the principles of the invention. FIG. 2 is similar to the arrangement in FIG. 1, with similar components bearing the same reference number. However, in FIG. 2 content mover device 7 is connected directly to STB 2 rather than connected through router 5. Content mover device 7 may be connected via an Ethernet, USB, wireless (WiFi or Bluetooth) connection, or any suitable connection. Router 5 may be connected to the content mover device 7 via an Ethernet connection, a wireless (WiFi), USB data, or other suitable type of connection.

Figure 3:
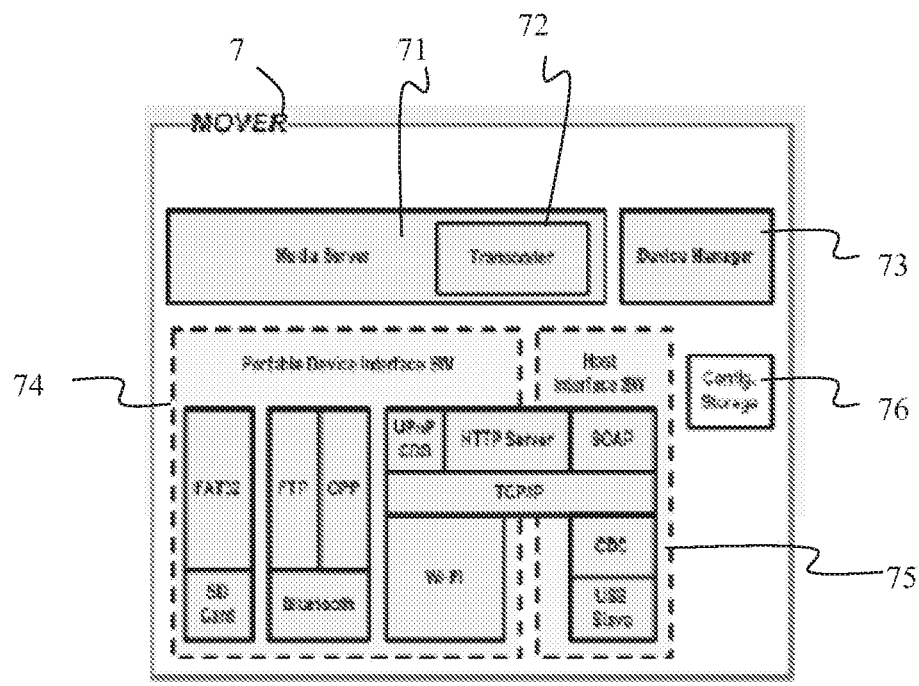
FIG. 3 illustrates an exemplary architecture of a content mover device 7 in accordance with the principles of the invention.

FIG. 3 illustrates an exemplary architecture of a content mover device 7 in accordance with the principles of the invention. As illustrated in FIG. 3, content mover device 7 may include a media server 71 with a transcoder module 72. A device manager 73 may be included to control the operations of content mover device 7. A portable device interface unit 74 may be provided to communicate with a desired portable device. The portable device interface unit 74 may include modules for controlling file access, such as XFF or a file allocation table (FAT), SD card access control. Wireless interfaces, e.g., Bluetooth including FTP and CPP modules may be used, as well as a WiFi module with Digital Living Network Alliance (DLNA)/Universal Plug and Play (UPnP) Content Directory Service (CDS), TCP/IP and HTTP protocols. A host interface module 75 may include a USB slave, CDC, TCP/IP, HTTP server, and Simple Object Access Protocol (SOAP) interface modules. A storage controller 76 may be included to control access to attached or internal storage.

An external storage can also be attached to content moving device via, for example, USB or Serial Advanced Technology Attachment (SATA) or SD Card interface. This storage device may be shared with Set Top Box or other devices on the network.

Mover can also access the storage media, internal or external to other devices, like DVR. It can use those to store back the transcoded content. This can be done in addition to or in place of the storage internal to content moving device. The external storage can also be used as an extended storage size or to do long term archiving of the content.

Figure 4:
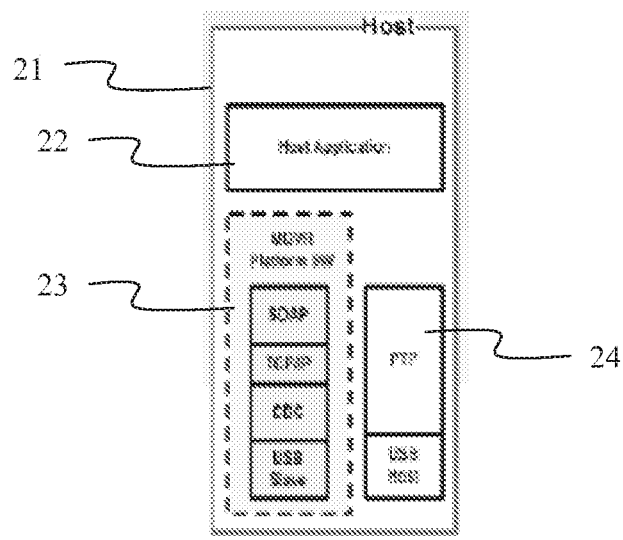
FIG. 4 illustrates an exemplary architecture for a host module 21 contained in STB 2 for interacting with content mover device 7 in accordance with the principles of the invention.

FIG. 4 illustrates an exemplary architecture for a host module 21 contained in STB 2 for interacting with content mover device 7 in accordance with the principles of the invention. As illustrated, the host module 21 may include a host application controller 22, a mover module 23 containing a platform for controlling SOAP, TCP/IP, CDC, and USB Slave modules. A PTP module 24 with a USB host interface controller may also be included.

Figure 5:
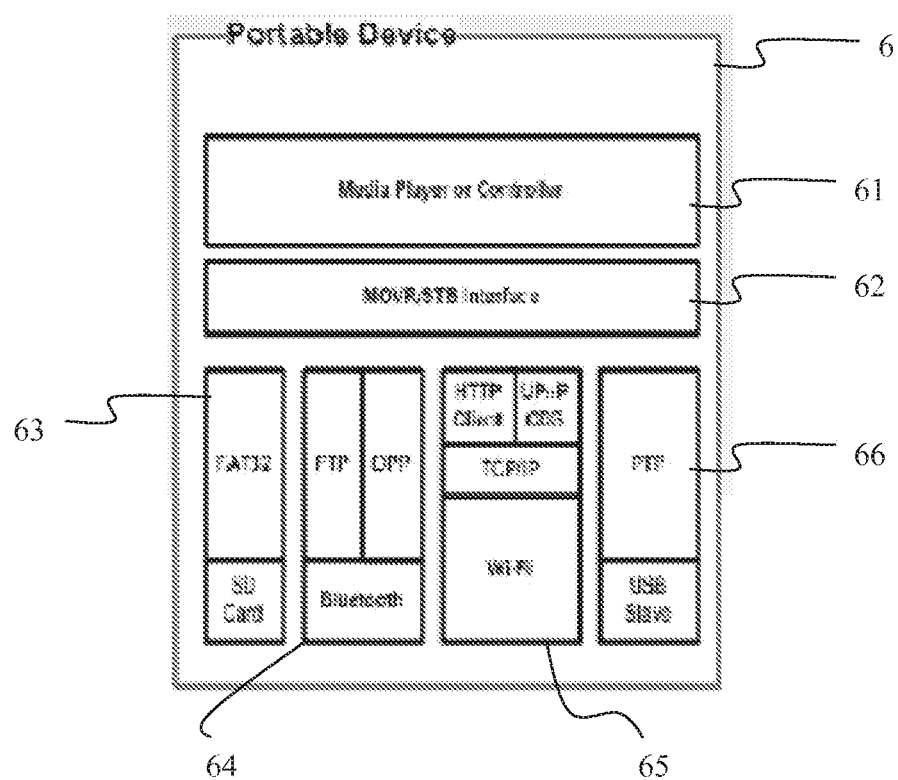
FIG. 5 illustrates an exemplary architecture for a portable device in accordance with the principles of the invention.

FIG. 5 illustrates an exemplary architecture for a portable device in accordance with the principles of the invention. A illustrated, portable device 6 may include a media player controller 61, a mover/STB interface module 62, a FAT SD card module 63 for controlling file access, such as a file allocation table (FAT), SD card access control. Wireless interface modules 64, e.g., Bluetooth including FTP and CPP modules may be used, as well as a WiFi module 65 with UPnP CDS, TCP/IP, HTTP, DLNA, IPRM and DCPT protocols. A host interface module 66 may include a USB slave and PTP modules.

Table 1 provides an overview of exemplary system configurations for content mover device 7. A indicated, video, audio and packaging (container) formats may be changed on an input stream to a different formats on the output stream. Categories for changing may include: video format, resolution, bit rate, and frame rate; audio format, bit rate, and channels; and container formats.

TABLE 1 overview of system configurations

| Media | Category | Input | Output |
|---|---|---|---|
| Video | Format | AVC/H.264 Main, High & Baseline Profile MPEG-2 | AVC/H.264 Main, High & Baseline Profile, MPEG-2 AVC/H.264 Baseline, Main & High Profile, MPEG-2 |
| | Resolution | HD (1080p, 1080i, 720p) | HD, ED/SD, 1/2 VGA, HVGA, QVGA, CIF, HCIF, QCIF |
| | | ED/SD/WVGA (480i, 480p, 576i, 576p) | ED/SD, 1/2 VGA, HVGA, QVGA, CIF, HCIF, QCIF |
| | Bit Rate | up to 20 Mbps | 20 Mbps down to 64 Kbps |
| | Frame Rate | Interlaced: 30, 25 fps Progressive: 60, 30, 50, 25, 24 fps (can not support 1080p60) | Can be lower than input (if desired, as may be the case for some mobile phones) |
| Audio | Format | AC3, MPEG-2 Audio | MP3, AAC-LC, AAC-HE |
| | Bit Rate | up to 320 Kbps | up to 320 Kbps |
| | Channels | 5.1 2.0 | 5.1, 2.0 2.0 |
| Container | Format | MPEG-2 TS, MP4 | MPEG-2 TS, MP4 |

The content moving device may check for not only new content recordings on a regular basis but also any DVR deletions as well. Any change, e.g., deletion of content, in the DVR may be mirrored in the content moving device's own storage/memory. The content moving device may handle all the issues relating to copy management, and obey the digital rights associated with the DVR recording, such as obeying copy once restrictions of the original broadcast program.

However, an advanced user may want to have more control on managing how and which content is transcoded, stored and deleted on Mover. For such user an option is provided to prioritize which content is more important, which one is deleted as the memory in the content moving device gets filled up. For example, he can set the priority based on episode, series or genre etc. Content can also be selected individually and provided the desired priority by the user. An option is provided for a user go to deeper layer of interaction to personalize the behavior of Mover to his liking. This personalization can be done via the interface on the mobile device, a PC or similar device connected on the network with access to content moving device or through Set Top box and TV.

If the network consists of multiple DVRs, then default setting may be that the content that is oldest among those DVRs is deleted first. For mirroring operation, Mover can either ping-pong between those DVRs or select the transcoding order from the most recent to the last stored content among those DVRs. A user can also modify the default setting by either giving some content higher priority over others. This can be done by either setting the priority a-priori or setting it dynamically by the user by requesting from the end device the content that needs to be transferred.

The communication between the content mover device, PMP and DVR on the user's home network may be established through a discovery process, such as using UPnP. For example, the content mover device and/or PMP may use UPnP to discover any DVR on the local home network. The content mover device and/or PMP may identify server devices (i.e., DMS) and selects the DVR(s). If there are other source devices such as PCs, the content moving device/PMP may exclude them from future content discovery.

In a preferred implementation, the content mover device 7 transcodes DVR content and stores the transcoded content on a storage associated with the content mover device 7. Those of skill in the art will appreciate that the DVR is preferably connected to the mover or home network to share content with content mover device, the content mover device is connected to the home network and is turned on, and the content mover device has been configured with the DVR. The content mover device and the user's PMP are also preferably configured accordingly (e.g., default content resolution and format).

The mover device may be suited to operate with multiple PMP devices as well as multiple DVRs. The mover device 7 may include a device profile database which identifies desired content characteristics of a particular PMP, for example. The mover device 7 may determine the identity of a PMP requesting content, and provide transcoded content to the PMP according to the characteristics in the device profile database.

Figure 6:
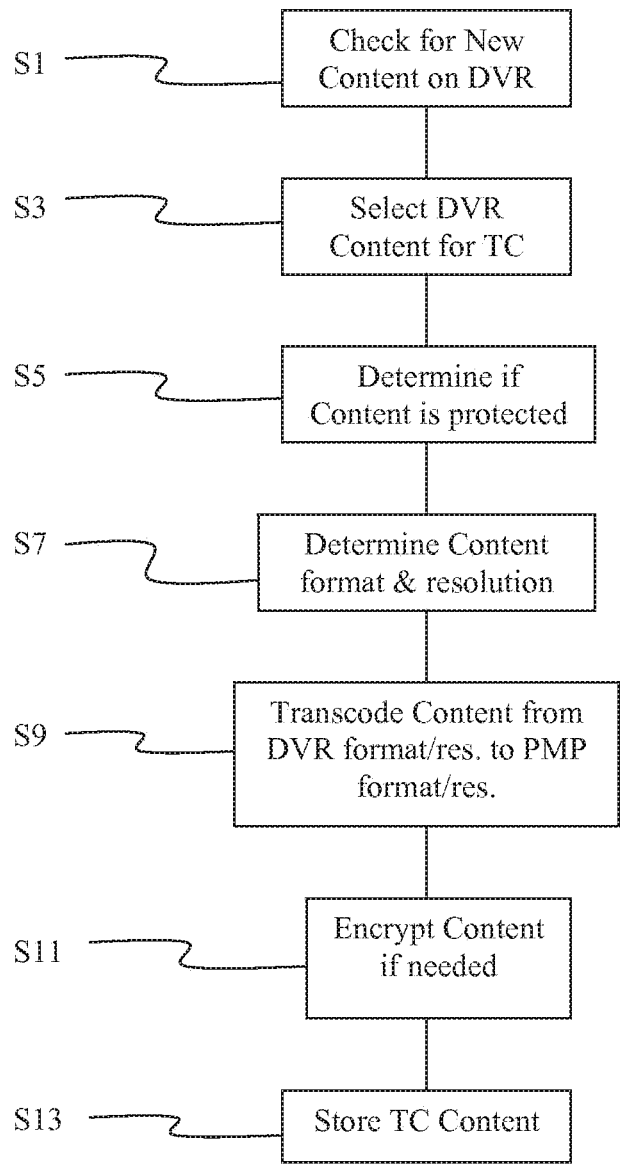
FIG. 6 illustrates an exemplary process for moving content from a DVR 2 to the content mover device 7 in accordance with the principles of the invention.

FIG. 6 illustrates an exemplary process for moving content from a DVR 2 to the content mover device 7 in accordance with the principles of the invention. The content mover device manager 73 may check for new content on the DVR 2, step S1, such as by requesting a list of recordings from the DVR host application 22. The mover device may check for new content on the DVR at predetermined time periods, e.g., periodically every 5 minutes, every hour, once a day, etc., the length of time in the periods may be preset in the mover device, programmable by a remote network, or set by a user. The mover may also or alternatively check for content based on an event at the DVR or STB associated with the DRV. For example, the DVR may provide a notification to the mover device when a recording is started, a deletion occurs or a recording or deletion event has been scheduled. The content mover device manager 73 may compare the list with a list of already transcoded content on the content mover device 7. The content mover device manager 73 may select one content item from the DVR, step S3 and requests the selected content for transfer. The selection of the content may be based on a user selection, or based on a preconfigured algorithm as a candidate for transcoding.

The content may be provided to mover device 7 while it is being recorded on the DVR. For example, the mover device may transcode the content simultaneously with the recording of the content. The DVR may push the content to the mover device 7 when a recording is initiated. Alternatively, the mover device 7 may request the content (e.g., pull) content during a DVR recording. A time marker within the content, e.g., a presentation time stamp provided by the content provider, may be used to prevent mover device from catching up to the real time presentation of the content, e.g., to maintain a delay between receipt of the data from the STB and transcoding of the data on the mover device 7.

In a semi-push mode of operation, the mover device 7 may send a request to the DVR/STB relating to new content being recorded by the DVR. The STB/DVR may respond with information associated with the requested content along with the requested content (e.g., meta data) or separated from the content. The meta data may include the duration of the content already recorded on the DVR and a flag indicating if the content is live and being recorded. The mover device 7 may detect a start indicator of the content, e.g., a start presentation time stamp (PTS). The mover device 7 may attempt to complete transcoding of the new content to be finished close to the end of the recoding of the new content on the DVR. The mover device 7 may increase its transcoding rate to transcode the content until it reaches close to a real time presentation of the content according to the PTS indicator. At such point, the transcoder may switch to a lower speed transcoding rate, e.g., a real time transcode mode, until the end of the content is reached. In this manner, the transcoded content may be available to the user shortly after the DVR recording is completed, and shortly after the content is provided to the STB/DVR. The transcoding speeds may be adjusted according to the following equation: Mode=Fast_Mode if(Tcurrent_pts−Tstart_pts)< (Tnow−Tstart_system_time)+Tduration−Tguard_interval, Mode=Realtime_Mode otherwise. Where, Tcurrent_pts is the most recent video frame's PTS timestamp; Tstart_pts is the start video frame's PTS timestamp; Tnow is the current system time; and Tstart_system_time is the system time when Mover starts the transcoding; Tduration is the duration time for the live content obtained from meta data; and Tguard_interval is the guarding time interval. The guarding time interval may be set to any suitable value such as 1-2 minutes.

The content stored on the DVR 2 may have certain protections such as DRM restrictions, accordingly, content mover device manager 73 determines whether and how the content is protected, step S7. If the content is protected, the content mover device uses the content protection technology specified in the CDS to obtain decryption keys and content rights from the DVR. Content mover device manager 73 determines the format and resolution on the incoming content and selects the format and resolution for the transcoded content based on the PMP(s) that have been configured on the content moving device, step S7. For example, with reference to table 1, content with an audio format of AC3 may be transcoded to an MP3 format. Content moving device 7 transcodes the content from the DVR 2 into the identified formats and resolution, step S9. The transcoding process may include decoding at transcoder 72 the incoming content in its existing format and re-encoding the content in a desired format.

If the content is to be further protected after transcoding, the content mover device manager 73 determines encryption keys and resulting rights for the transcoded content, step S11. If the content is encrypted on the DVR, after requesting content from the DVR, the content mover device 7 decrypts portion of the content, transcodes portion of the content, and encrypts the transcoded portion of the content. The transcoded encrypted content and non-encrypted content is stored in a local storage associated with the content mover device 7 via storage manager 76, step S13. Protected content may be limited by copy protection constraints: a. encrypted "copy-free" content with restrictions (e.g., ENR, RCT, CGMS-A) may be copied to the content moving device, b. "copy-once" content (i.e., marked as "copy-no-more" on the DVR) can only be "moved" (instead of copied) to the content moving device. Unprotected copy-free content may be copied to the content mover device within proximity.

The DVR content may be provided to the content mover device 7 and processed by the content moving device as an entire content file or in discrete portions or segments of content. For example, a segment of video may be decoded, re-encoded and stored prior to the next segment. Process may repeat to receive segments until entire file has been transferred, transcoded and stored on the storage associated with the content mover device.

The content mover device 7 may repeat steps S1-S13 for each content of interest on the DVR until the list of candidates is empty or the content mover device 7 associated local storage is full.

In some implementations, the content mover device 7 may be configured to request content from DVR 2 at set predetermined times of day. The set predetermined times may be chosen by the user, set within the content mover device 7 at the time of manufacture, or determined by the content mover device 7 in connection with historical time periods of a user for requesting content from the content mover device 7, as periods of low activity on the DVR. The content mover device 7 may set a local timer to wake up and check for new recorded content on the DVR.

In some implementations, the content mover device may transcode virtually all of the content stored on the DVR, so as to effectively create a mirror image of the DVR stored content.

The content mover device 7 may also receive content from a portable media player (PMP). Those of skill in the art will appreciate that the PMP and content mover device are configured to communicate with each other and the PMP is provisioned to the user's home network.

Figure 7:
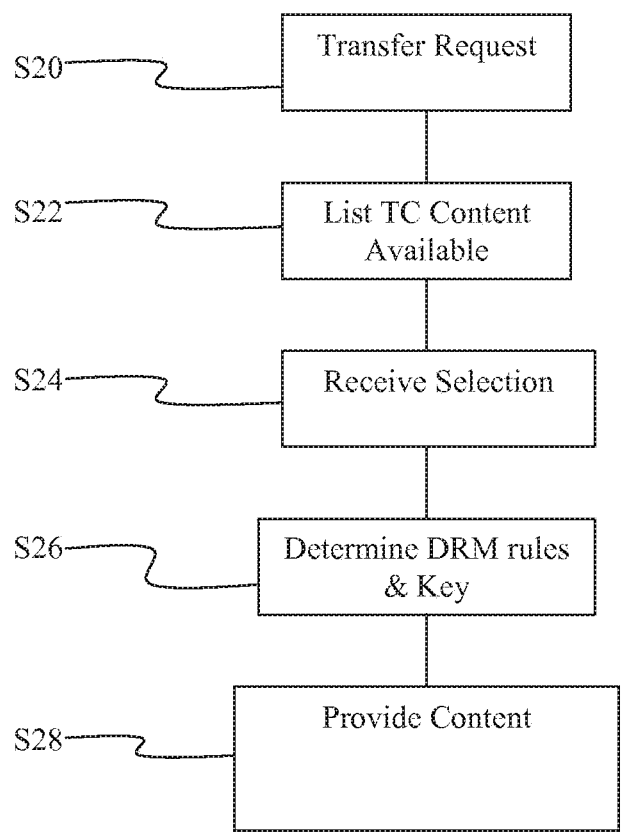
FIG. 7 illustrates a process for transferring content from the content mover device 7 to a PMP in accordance with the principles of the invention.

FIG. 7 illustrates a process for transferring content from the content mover device 7 to a PMP in accordance with the principles of the invention. As illustrated, a transfer request may be made by the PMP and received by the content mover device, step S20. For example, a user may activate a "DVR Sync" application running on the PMP to initiate the process. A list of transcoded content stored by the content mover device may be made available to the PMP for selection, step S22, to enable the PMP to discover a list of transcoded content items on the content mover device.

Figure 8:
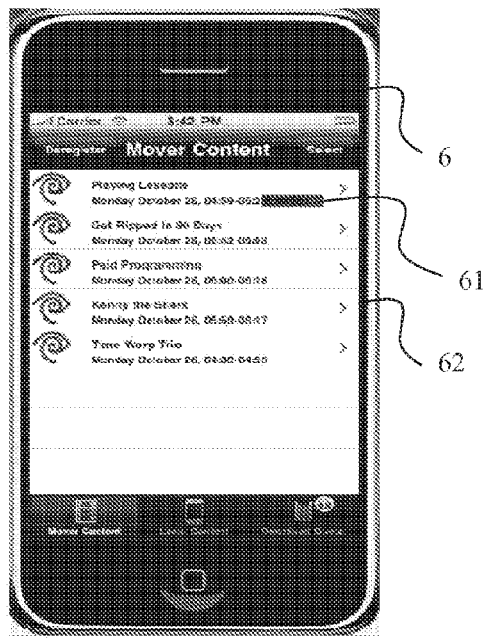
FIG. 8 illustrates an exemplary display on a PMP for content selection in accordance with the principles of the invention.

FIG. 8 illustrates an exemplary display on a PMP for content selection. As illustrated, PMP 6 preferably includes a display which displays the transcoded content available for download 62 on to the PMP 6 from the content mover device. Once content is selected for download, an icon may be shown indicating the download status 61.

This list may optionally include DVR content that has not been transcoded (e.g., due to limited content moving device local storage space). The non-transcoded list my be a list constructed in real-time by getting a fresh list from the DVR or it may be a snapshot from the last time the content moving device requested the list from the DVR. The PMP may compare the list with a list of already transferred content in local storage and select one content item from the content mover device based on a preconfigured algorithm as a candidate for transfer, and provide the selection to the content mover device, step S24.

If the content is protected, e.g., with encryption, the PMP may be provided with the decryption keys and any DRM rules associated with the content, step S26. If IPRM is used, this may require the PMP to request a ticket from the content mover device or the DVR prior to accessing the content. The PMP may create a local DRM license with the decryption key and rights. For example, if the DVR content was originally restricted as "copy once" and, therefore, marked as "copy no more" after transcoding on the content mover device, the transfer to the PMP may be a "move" rather than a "copy".

Figure 9:
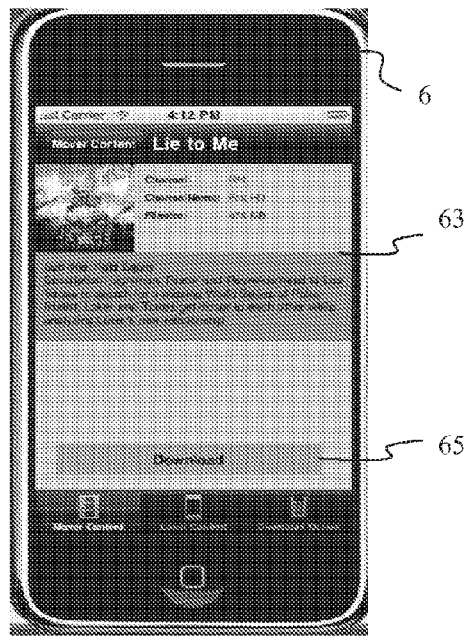
FIG. 9 illustrates an exemplary display of content details on a PMP in accordance with the principles of the invention.

FIG. 9 illustrates an exemplary display of content details on a PMP. As illustrated in FIG. 9, additional details related to the content may also be displayed with the content on PMP 6. Additional details 63, may be carried in meta data associated with the content. The additional details may include a description of the content, a rating, run time, channel name and number, file size, actors in the content, etc. A download selection button 65 may be provided to enable a user to request transfer of the content from the mover device.

Figure 10:
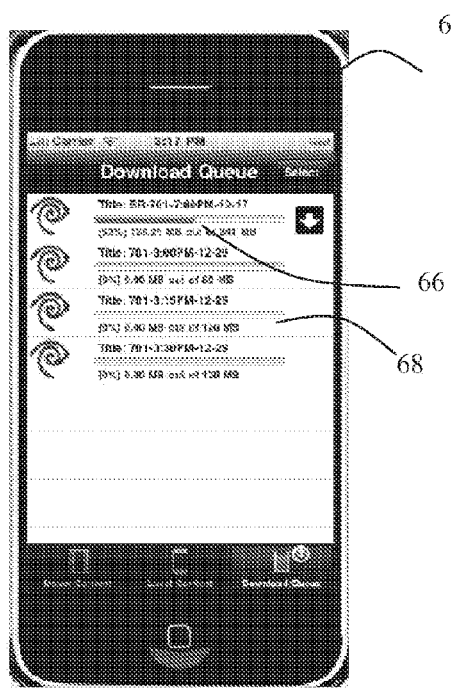
FIG. 10 illustrates a download queue on the PMP in accordance with the principles of the invention.

FIG. 10 illustrates a down load queue on the PMP 6. Multiple items of content 68 may be selected for download at one time, and a download queue may be established. A download status indicator bar 66 may be displayed to indicate the progress of the download operation.

In step S28, the content mover device provides the requested content to the PMP. If DTCP-IP is used, the PMP may decrypt the content. The PMP may encrypt and store the received transcoded content in a local storage associated with the PMP. The steps in FIG. 7 may be repeated for each requested content. In the above manner, PMP may have all (or a subset) of the content mover device's transcoded content items in its local storage ready to be watched locally on the PMP.

Once the PMP has the content, it may play the content without being connected to the user's home network. The user may play the content by starting a "DVR to go" application. In on implementation, the PMP may list all content items transferred from the MOVER, for user selection. Once the selection is made, the PMP determines DRM rules and the content decryption key if the content is encrypted. The PMP decrypts, decodes and renders the content for consumption by the user, and may update any metadata associated with the content. Once the user finishes watching the content, the PMP may mark the content as "watched". The watched content may be a candidate for deletion if there is not enough space to transfer more content later.

The content mover device 7 may need to delete stored transcoded content to free up storage space for new content. When content moving device's memory is full or close to getting full, e.g., 95% full, it needs to delete some of the transcoded content. It can be done based on the rules set by the user or the service provider or the default setting. An example of default setting is that the content corresponding to the oldest one stored on DVR is deleted from the content moving device's memory first. Another example is that the content that is allowed to be copied freely and transferred to an end device is deleted first. Between HD and SD content, the HD content may be given higher priority by the user or the service provider.

In one implementation, the content mover device may have a user interface, such as a display (e.g., touch screen display) and input device (e.g., keypad or pointer) which allows the user to select content for deletion. Alternatively, the content mover device may use an attached television as the display. In one implementation, the content mover device may not have a user interface in which a user may select the content to be deleted. The content mover device may use certain parameters to decide which content to delete when new content needs to be transferred from the DVR. This process may include decision attributes such as:
1. oldest content is deleted first;
2. content deleted from the DVR may be deleted from the content moving device as well;
3. content already transferred to the PMP may be deleted (this may not work well if multiple PMPs are present in the home);
4. SD content may be deleted before HD content (due to speed of transcoding HD content); and/or
5. keep only last 3 episodes of any series The PMP may also perform content deletion operations to make more storage space available for newly transcoded content to be transferred from the content mover device. This could be done automatically based on the user preferences or explicitly by the user via the user interface. When a particular recording is deleted on the DVR, the content moving device may ignore that fact and keep the transcoded copy available for further copying to PMPs. The copy on the content mover device may be removed using a regular storage cleanup approach as discussed above. Alternatively, the content moving device may try to represent a mirror image of the DVR recordings, e.g., the content moving device may delete the content as well. Content to be deleted may be determined by comparing the latest list of content from the DVR with the list of content on the content moving device. Any content item found in the content moving device and not in the DVR's list may be deleted.

The content moving device is not only capable to take the content out of a Set Top Box for consumption on other devices, it can also take the content from other devices for consumption by a set top box, TV or other devices connected to Set Top Box or content moving device via Internet. For example, it can accept and video captured by a video camera of a digital camcorder or a mobile phone, convert it to the format decodable and playable by Set Top box for display on a TV, or decodable and playable by a portable device connected to content moving device by in-home network or Internet. It can also adjust the resolution and bit rate of the video to lower the bandwidth required to send the content on the internet. That content can be consumed by other users far away or loaded on social networking web sites.

Some or all of the operations set forth in FIGS. 6 and 7 may be contained as a utility, program, or subprogram, in any desired computer readable storage medium, which may be a non-transitory medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The content mover device enables a user to conveniently and efficiently move user recorded content from one user device (e.g., a DVR) to another user device (e.g., PMP). The content mover device performs the often time consuming and computationally intensive task of transcoding content stored on the first device in a first format into a second format usable by the second device. The transcoding operation may be performed automatically independent of a request for the content by the PMP. The transcoding operation may be performed at predetermined times during periods of inactivity or based on historical user interactions with the content mover device or DVR. In this manner user may not need to wait for desired content to be transcoded in order to move the content onto his/her PMP.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What is claimed is:

1. A system for transferring content from a media device to a mobile device, comprising:
   a memory; and
   a hardware processor, that when executing computer-executable instructions stored in the memory, is configured to:
      determine that the media device has stored a video content item in a video format;
      determine that a communication channel has been established with the mobile device;
      receive, from the mobile device, a mobile video format to be associated with the mobile device, wherein the mobile video format is a format suitable for presenting content on the mobile device, and wherein the mobile video format is different than the video format;
      transcode the video content item by decoding the video content item into decoded content and encoding the decoded content into transcoded content in the mobile video format, wherein the video content item is transcoded independent of a request for the video content item by the mobile device;
      store the transcoded content in the mobile video format in the memory; and
      in response to receiving a request for the transcoded content from the mobile device, transmit the transcoded content to the mobile device.

2. The system of claim 1, wherein each of the video format and the mobile video format has particular characteristics that include a format and a resolution of each format.

3. The system of claim 1, wherein the video format has particular characteristics that include a first container format, and the mobile video format has particular characteristics that include a second container format, and wherein the first container format is different from the second container format.

4. The system of claim 1, wherein the hardware processor is further configured to:
   store the mobile video format in a mobile device profile that corresponds to the mobile device, wherein the mobile device profile is stored in a device profile database that includes at least one device profile other than the mobile device profile.

5. The system of claim 1, wherein the hardware processor is further configured to:
   determine that the media device has stored one or more video content items that are not in the mobile video format and have not been transcoded into the mobile video format;
   transcode the one or more video content items by decoding the one or more video content items into one or more decoded content items and encoding the one or more decoded content items into one or more transcoded content items in the mobile video format; and
   store the one or more transcoded content items in the mobile video format on the memory.

6. The system of claim 5, wherein the hardware processor is further configured to:
   cause an indication to be presented, on the mobile device, that the one or more transcoded content items in the mobile video format are available for the mobile device to download.

7. The system of claim 1, wherein the hardware processor is further configured to:
   determine that the video content item has been deleted from the media device; and
   in response to determining that the video content item has been deleted from the media device, delete the transcoded content from the memory.

8. A method for transferring content from a media device to a mobile device, comprising:
   determining, using a hardware processor, that the media device has stored a video content item in a video format;
   determining that a communication channel has been established with the mobile device;
   receiving, from the mobile device, a mobile video format to be associated with the mobile device, wherein the mobile video format is a format suitable for presenting content on the mobile device, and wherein the mobile video format is different than the video format;
   transcoding the video content item by decoding the video content item into decoded content and encoding the decoded content into transcoded content in the mobile video format, wherein the video content item is transcoded independent of a request for the video content item by the mobile device;
   storing the transcoded content in the mobile video format in the memory; and
   in response to receiving a request for the transcoded content from the mobile device, transmitting the transcoded content to the mobile device.

9. The method of claim 8, wherein each of the video format and the mobile video format has particular characteristics that include a format and a resolution of each format.

10. The method of claim 8, wherein the video format has particular characteristics that include a first container format, and the mobile video format has particular characteristics that include a second container format, and wherein the first container format is different from the second container format.

11. The method of claim 8, further comprising:
    storing the mobile video format in a mobile device profile that corresponds to the mobile device, wherein the mobile device profile is stored in a device profile database that includes at least one device profile other than the mobile device profile.

12. The method of claim 8, further comprising:
    determining that the media device has stored one or more video content items that are not in the mobile video format and have not been transcoded into the mobile video format;
    transcoding the one or more video content items by decoding the one or more video content items into one or more decoded content items and encoding the one or more decoded content items into one or more transcoded content items in the mobile video format; and
    storing the one or more transcoded content items in the mobile video format on the memory.

13. The method of claim 12, further comprising:
causing an indication to be presented, on the mobile device, that the one or more transcoded content items in the mobile video format are available for the mobile device to download.

14. The method of claim 8, further comprising:
determining that the video content item has been deleted from the media device; and
in response to determining that the video content item bas been deleted from the media device, deleting the transcoded content from the memory.

15. A non-transitory computer-readable medium containing computer-executable instructions that, when executed by a processor, cause the processor to perform a method for transferring content from a media device to a mobile device, the method comprising:
determining that the media device has stored a video content item in a video format;
determining that a communication channel has been established with the mobile device;
receiving, from the mobile device, a mobile video format to be associated with the mobile device, wherein the mobile video format is a format suitable for presenting content on the mobile device, and wherein the mobile video format is different than the video format;
transcoding the video content item by decoding the video content item into decoded content and encoding the decoded content into transcoded content in the mobile video format, wherein the video content item is transcoded independent of a request for the video content item by the mobile device;
storing the transcoded content in the mobile video format in the memory; and
in response to receiving a request for the transcoded content from the mobile device, transmitting the transcoded content to the mobile device.

16. The non-transitory computer-readable medium of claim 15, wherein each of the video format and the mobile video format has particular characteristics that include a format and a resolution of each format.

17. The non-transitory computer-readable medium of claim 15, wherein the video format has particular characteristics that include a first container format, and the mobile video format has particular characteristics that include a second container format, and wherein the first container format is different from the second container format.

18. The non-transitory computer-readable medium of claim 15, wherein the method further comprises:
storing the mobile video format in a mobile device profile that corresponds to the mobile device, wherein the mobile device profile is stored in a device profile database that includes at least one device profile other than the mobile device profile.

19. The non-transitory computer-readable medium of claim 15, wherein the method further comprises:
determining that the media device has stored one or more video content items that are not in the mobile video format and have not been transcoded into the mobile video format;
transcoding the one or more video content items by decoding the one or more video content items into one or more decoded content items and encoding the one or more decoded content items into one or more transcoded content items in the mobile video format; and
storing the one or more transcoded content items in the mobile video format on the memory.

20. The non-transitory computer-readable medium of claim 19, wherein the method further comprises:
causing an indication to be presented, on the mobile device, that the one or more transcoded content items in the mobile video format are available for the mobile device to download.

21. The non-transitory computer-readable medium of claim 15, wherein the method further comprises:
determining that the video content item has been deleted from the media device; and
in response to determining that the video content item bas been deleted from the media device, deleting the transcoded content from the memory.

* * * * *